(12) United States Patent
Guo

(10) Patent No.: US 7,055,458 B2
(45) Date of Patent: Jun. 6, 2006

(54) SYSTEM FOR THE PRESENTATION OF ANIMALS TO BE MILKED AND METHOD

(76) Inventor: Fangjiang Guo, 135 Simsbury Dr., Ithaca, NY (US) 14850

(*) Notice: Subject to any disclaimer, the term of this patent is extended or adjusted under 35 U.S.C. 154(b) by 354 days.

(21) Appl. No.: 10/062,957

(22) Filed: Jan. 31, 2002

(65) Prior Publication Data
US 2003/0140860 A1 Jul. 31, 2003

(51) Int. Cl.
*A01K 1/12* (2006.01)
(52) U.S. Cl. .................... 119/14.04; 119/14.02; 119/843
(58) Field of Classification Search ........... 119/14.01, 119/14.02, 14.03, 14.04, 14.08, 14.14, 14.11, 119/520, 843
See application file for complete search history.

(56) References Cited

U.S. PATENT DOCUMENTS

| | | | |
|---|---|---|---|
| 3,536,045 A | 10/1970 | Flocchini | |
| 3,703,884 A * | 11/1972 | Maddalena et al. | 119/520 |
| 3,792,686 A | 2/1974 | Needham et al. | |
| 3,810,442 A * | 5/1974 | Jacobs et al. | 119/14.03 |
| 3,828,733 A | 8/1974 | Correia | |
| 3,877,419 A | 4/1975 | Rodger | |
| 3,937,297 A | 2/1976 | Jacobs et al. | |
| 4,006,712 A | 2/1977 | Peel | |
| 4,207,837 A | 6/1980 | Schwartau et al. | |
| 4,261,292 A | 4/1981 | Le Du | |
| 4,323,033 A | 4/1982 | Vosyka et al. | |
| 4,419,961 A | 12/1983 | Vandenberg et al. | |
| 4,763,605 A | 8/1988 | Braum | |
| 4,936,255 A | 6/1990 | Pera | |
| 5,000,119 A | 3/1991 | Moreau et al. | |
| 5,042,428 A | 8/1991 | Van der Lely et al. | |
| 5,140,942 A | 8/1992 | Flocchini | |
| 5,203,280 A * | 4/1993 | Nelson | 119/14.03 |
| 5,285,746 A | 2/1994 | Moreau | |
| 5,392,731 A | 2/1995 | Hoppman et al. | |
| 5,469,808 A | 11/1995 | Street et al. | |
| 5,483,921 A | 1/1996 | Waybright | |
| 5,615,637 A * | 4/1997 | Nelson | 119/14.03 |
| 5,638,768 A | 6/1997 | Moreau | |
| 5,768,997 A | 6/1998 | Meier | |
| 5,771,837 A * | 6/1998 | van der Lely | 119/14.02 |
| 5,782,199 A * | 7/1998 | Oosterling | 119/14.02 |
| 5,784,994 A | 7/1998 | van der Lely | |
| 5,959,526 A * | 9/1999 | Tucker | 340/572.1 |
| 5,960,736 A | 10/1999 | Ludington et al. | |
| 6,050,219 A | 4/2000 | van der Lely | |
| 6,116,188 A | 9/2000 | van der Lely | |
| 6,161,502 A | 12/2000 | Simpson et al. | |
| 6,205,949 B1 | 3/2001 | van den Berg | |
| 6,516,744 B1 * | 2/2003 | Bjork et al. | 119/14.02 |
| 6,814,026 B1 * | 11/2004 | Guo | 119/14.02 |
| 2001/0042515 A1 * | 11/2001 | Gallagher et al. | 119/14.03 |
| 2001/0047765 A1 * | 12/2001 | DeWaard | 119/14.03 |
| 2002/0023592 A1 * | 2/2002 | Peacock | 119/14.03 |
| 2004/0011294 A1 * | 1/2004 | Guo | 119/14.02 |

* cited by examiner

*Primary Examiner*—Teri Pham Luu
*Assistant Examiner*—Kimberly S. Smith
(74) *Attorney, Agent, or Firm*—Roger Aceto, Esq.; Brian B. Shaw, Esq.; Harter, Secrest & Emery LLP

(57) ABSTRACT

A milking parlor for presenting an animal to be milked rearwardly loads the animal into a milking stall through an ingress/egress gate and forwardly unloads the animal from the milking stall through the same ingress/egress gate to pass along a unique exit path to a released area.

19 Claims, 16 Drawing Sheets

SYSTEM FOR THE PRESENTATION OF ANIMALS TO BE MILKED AND METHOD

FIELD OF THE INVENTION

The present invention relates to the presentation of an animal to be milked in a milking parlor, and more particularly, to the rearward ingress and unrestricted forward egress of an animal from a milking stall.

BACKGROUND OF THE INVENTION

A milking parlor generally includes an array of individual milking stalls, each milking stall being designed to hold a cow or other dairy animal while being milked. Typically, an operator or milking robot is required to perform such tasks as insuring that the animals are properly situated in the milking stalls, washing the udder prior to milking, applying milking units; monitoring and attending to operation of the milking units.

Generally, there are two principle ways to milk cows. One method is to bring the milking equipment to the cows while the cow is retained in a, often described as around the barn pipeline, or pipeline, tie-stall, and stantion barn. The alternative method of milking cows is to bring the cows to the milking equipment. This arrangement is known as free-stall or milking parlor. There are several ways to configure the milking system.

Pipeline Milking System

In the pipeline milking system, each cow is confined to its own stall or stanchion (headlock device). In the stall, the cow is fed, watered and can lay down. The cow is restrained to the stall by tying (tie-stall) or stanchion.

A milk line is routed over the stalls along with a pulsator line and any electrical lines needed to operate corresponding milking units. Routing the milk line over the stalls is referred to as a high line. The milk line routes the milk to a milk room by gravity where the milk is pumped into a bulk tank. Ports or stall cocks are located between the stalls to which individual milking units connect.

In operation, the operator takes the milking unit to the stall and operably connects the milking unit to the stall cock. The milking unit is then applied to the cow.

When the cow has been milked out, the operator removes the unit and applies it to the next cow, moving the unit from stall cock to stall cock as the process moves throughout the barn.

As with any system, there are efficiency benefits and drawbacks to the pipeline milking system. One benefit is that the system allows the operator to prepare the next cow for milking while the previous cow is being milked. When the first cow is finished milking, the unit can be immediately moved to the prepared next cow. However, the pipeline system induces significant operator fatigue. The milking process requires the operator to bend over or squat down to access the udder for preparing, milking and post dipping. There is also considerable freedom for the cow to move around within the stall, which results in milking units being kicked off or stepped on. Immediate attention is required by the operator upon a milking unit being kicked off or stepped on. Further, there is little to protect the operator from being kicked or stepped on. As each stall requires a corresponding stall cock, a large number of stall cocks are employed and any percentage of failure or leakage results in required maintenance. Further, some portions of the milk line may be soiled by milk and not cleaned for hours, as the milking process has moved to another part of the barn. Also, the relatively long pipe lengths cause hot washing water to cool very quickly. In addition, once the milk has been extracted from the cow, it must be lifted to the pipeline running above the stall. Typically, this elevating process is done with the same vacuum used to extract the milk. Thus, a stable vacuum at the cow teats is very difficult to achieve. Although automation devices such as milk meters and automatic take offs have inherent individual benefits, it is difficult to implement these devices as they must be carried from cow to cow and secured to each stall.

Parlor Milking System

In the parlor milking system, each cow has a stall where it can lay down, however, the cows are not restrained to the stall and may move about the barn (free stall). For milking, the cows are gathered and taken to the milking parlor. Fences or gates form the milking stalls of the milking parlor and control the flow and position of the cows in the parlor. The fences and gates also serve to protect the operator from getting kicked or stepped on. Typically, the milking stalls are considerably smaller than those found in free stalls or tie stalls, as it is not intended that the cows lay down in the milking stall. This closer confinement reduces freedom of movement of the cow and results in less kick off of the milking unit. As the milking equipment is not manually moved from cow to cow, automatic take offs and milk meters can be permanently mounted and utilized efficiently in the milking parlor system.

Herringbone Milking Parlor—Batch Operation

The herringbone-milking parlor includes two rows of milking stalls separated by an operator pit. The milking stalls arrange the cows for milking from the side. The cows enter the milking parlor in a single file and turn at an angle away from the operator pit. The cows overlap each other and thus form a herringbone pattern. The operator works from the pit, which is a lowered area between the opposing rows of milking stalls. In the lowered operator pit, the operator is able to stand upright and attend to the cows without having to bend or squat down. The milk line is located along a side of the operator pit or in a basement below the parlor floor and is lower than the cow udder. This configuration provides for more stable vacuum at the teats, as the milk is not lifted by vacuum. Locating the milk line lower than the cow's udder is referred to as a low line system. However, as this herringbone parlor is a batch processing, when the first cow is finished milking it must wait until all the cows in the batch are finished before the cow can leave. Therefore, inefficiencies are encountered as milked cows in a batch cannot be replaced until the last cow in the batch has been processed.

Tandem Parlor—Batch or Single Operation

The tandem parlor also includes two rows of milking stalls separated by an operator pit. The milking stalls are arranged for milking the cows from the side. The cows enter the milking parlor single file and stop without turning away from the operator pit. This configuration requires a much longer milking parlor than other milking parlors having the same capacity. Each milking stall in the tandem parlor is the length of a cow from the next milking stall. Known variations of this arrangement allow each stall to have its own entrance and separate exit gate thereby allowing the operator to release a cow when it is finished and let a new cow into that stall even though the rest of the cows in that side are still milking. Typically, the tandem parlor also employs a low line. Further, the tandem parlor has a long walking distance for both animals and operators.

Parallel Parlor—Batch Operation

A parallel parlor also includes two rows of milking stalls separated by an operator pit. The milking stalls arrange the cows for milking from between the rear legs. The cows enter the parlor in a single file and turn perpendicular to the operator pit in a parallel cow-to-cow orientation. The parallel parlor allows for a very short milking parlor with each milking stall being only a cow's width away from the next milking stall. Further, since the milking is done from between the rear legs, the milking equipment is located where manure would fall upon it. A gutter is required to catch the manure before it can soil the milking equipment. The cows tail can also hinder milking from between the rear legs. Often trimming or docking the tail enhances efficiency of the parallel parlor.

Flat Barn Parlor—Single Operation

The flat barn-milking parlor includes one or two rows of milking stalls with no recessed operator pit or an elevation change in the milking parlor that can be handled by the cow stepping up. It is similar to the pipeline type arrangement, wherein, the operator milks the cows from the side and thus the operator must bend or squat to access the udder. Because there is no recessed operator pit, the cows can enter the milking stalls from the rear of the stall without having to move in a single file. This allows the operator to release a cow from the stall as soon as the cow is finished milking. The next cow may be then introduced into the milking stall from the rear of the milking stall. Some flat barn parlors have small recessed operator pits at each milking station where the operator steps down into the pit and does not have to bend over as far to milk the cow. Typically, these pits are located in between two adjacent milking stalls and do not run the length of the milking parlor and to reach more than two cows, the operator must step up out of one pit and step down into the next pit. Most flat barn parlors use a high line as cow traffic prevents the use of a low line. However, the operator walking distance in a flat barn parlor is longer than other parlor arrangements of equal capacity. That is, the stalls are arranged either in a single row, or the two rows of stalls are far enough apart to allow cow traffic between the rows. The flat barn parlor induces operator fatigue from the long walking distance and the need to either bend or squat to access the udder or climb in and out of individual recessed operator pits.

Rotary Parlor—Single Operation

In an effort to overcome the considerable time for cows to enter and fill the milking parlor in the herringbone and parallel parlor configurations, the rotary parlor is employed. The rotary parlor does not load and release cows in groups as do the herringbone and parallel arrangements. In contrast, the rotary parlor arranges a herringbone, tandem or parallel type stalls around a moving platform. When an empty stall passes the loading gate, a cow forwardly moves into the empty stall. The cow is milked either from the side or between the rear legs, depending upon the milking stall arrangement, as the milking parlor continues to rotate. Prior to reaching the entrance gate, where the cows are introduced, the milked cow is exposed to an exit gate. The speed of the rotation of the parlor is set such that cows requiring the longest time for milking are finished milking before reaching the exit gate.

However, there is no provision for releasing a cow as soon as the cow is finished and replacing the then empty milking stall with a fresh cow.

In most rotary parlors, the operator(s) can not see all of the animals in the parlor. A unit fall off may go undetected until an operator post dips the animal. If the operator detects a condition that requires immediate attention, they must chase the stall to remedy the situation.

The rotary parlor prevents the operator from having to wait for groups of cows to load into the parlor, but cows having a milking time that is less than the rotation time, must still wait before they can exit the parlor.

The rotary parlor uses a low line. However, the rotation of the rotary parlor requires a multitude of moving parts and enhanced complexity to install and service. For example, service connections to the parlor, including plumbing, vacuum, communications and electrical must be dynamic.

Therefore, a need still remains to enhance the efficiency in milking cows by eliminating idle time for both the operator and the equipment. The need exists for a method of presenting animals to be milked, wherein milking equipment and associated automation devices allow the operators to milk more cows faster than in a conventional milking system. The further need exists for enhancing ergonomic working conditions for operators.

SUMMARY OF THE INVENTION

A method and system for presenting animals to be milked is disclosed.

Generally, the method includes the rearward loading of the animal to be milked into a milking stall and the forward unloading of the animal from the milking stall, wherein the exiting animal completely passes from the milking stall along a unique exit path. A unique exit path is a path extending from the milking stall which path is used only by animals that have been milked. Unmilked animals never access the unique exit path. Further, a unique exit path is unique to a specific milking stall. Animals released from multiple stalls do not need to share exit paths, thereby providing for the selective simultaneous release of a plurality of milked animals. In a further configuration, the animal is passed through a single ingress/egress gate during rearward loading of the animal into the milking stall and forward unloading of the animal. Further, the present system can be employed with either a human operator or milking robot.

The present system further contemplates a holding area for retaining the animal to be milked, a milking stall spaced from the holding area and a cart translatable between the holding area and the milking stall for transporting the animal from the holding area to the milking stall for rearward loading of the animal into the milking stall.

DETAILED DESCRIPTION OF THE PREFERRED EMBODIMENT

The present invention employs rearward loading of an animal to be milked into a milking stall wherein the retained animal can be milked from the rear in a parallel pattern milking stalls or from the side via a herringbone pattern of the milking stalls.

As used herein, the term "rear milking" means accessing the teats from between, or through the rear legs of the animal.

Although the present system is described in terms of presenting the animal to be milked, and specifically of milking cows, it is understood the system is applicable to any domesticated milk producing animal including, but not limited to goats, sheep, bison, llamas and yaks. For the purpose of clarity the term "animal to be milked" is shortened to "the animal."

The term "loading" the animal into the milking stall means introducing the animal into the stall for milking. The modifier "rearward" or "backing" when used in connection with the animal means a direction of travel that is led by the tail or hind legs of the animal.

In contrast, the term "unloading" the animal from the milking stall means extracting the animal from the stall, typically after milking. The modifier "forward" or "forwardly" when used in connection with the animal means the animal proceeding in a direction of travel being led by its head.

Figure 1:
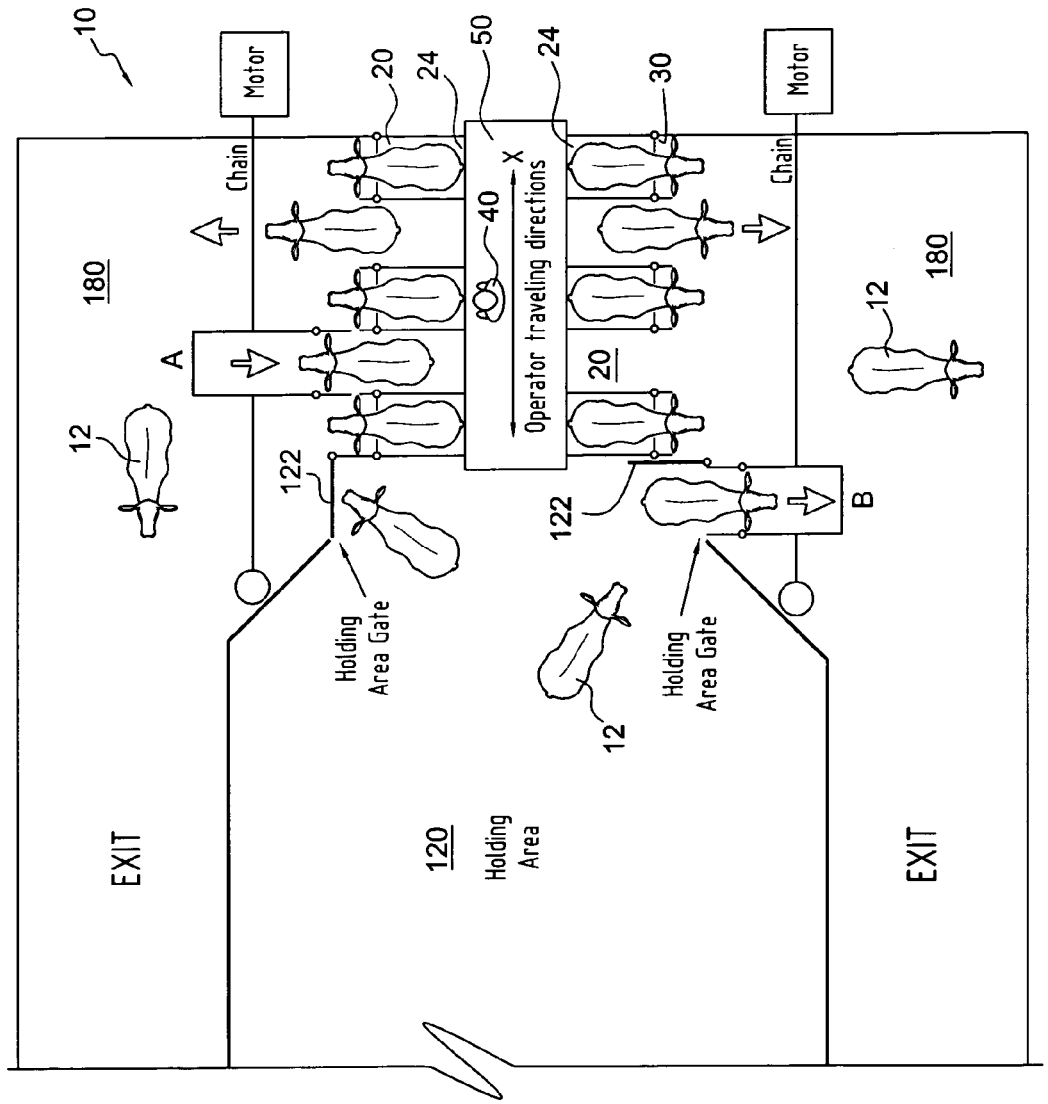
FIG. 1 is a schematic plan view of a milking parlor implementing the present invention.
Figure 2:
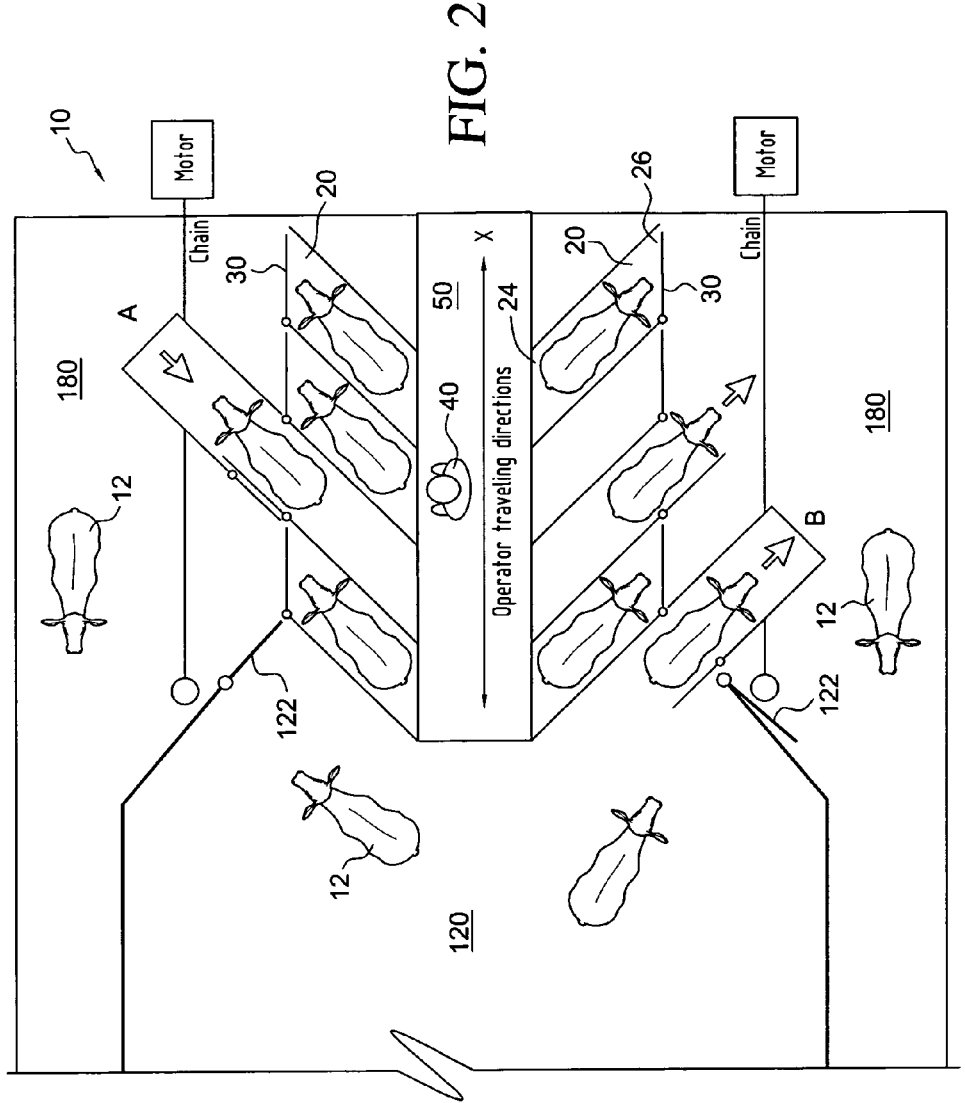
FIG. 2 is a top plan view of a herring bone alignment of the present invention.

Referring to FIGS. 1 and 2, the milking parlor 10 includes a plurality of milking stalls 20. Each milking stall 20 defines the space to which an animal 12 is confined while the animal is milked.

Further, the present system is described in terms of an operator 40, wherein it is understood the operator can be a milking robot or a human. It is contemplated the operator 40 can be a human operator or a milking robot, without effecting the scope of the present invention. In addition, the milking parlor 10 can have a controller 90 such as computer, personal computer or dedicated processor for cooperatively operating the various elements of the milking parlor 10.

The milking stalls 20 can be located about a central, operator pit 50. The operator pit 50 can have any of a variety of configurations including, but not limited to rectangular, square, oval, circular or triangular.

In a further configuration, the operator pit 50 is generally elongate, wherein a plurality of the milking stalls 20 extend along each of the longer dimensions of the pit. The milking stalls 20 can be perpendicular to the longitudinal dimension of the operator pit 50 (FIG. 1) or the milking stalls can be in a herring bone pattern (FIG. 2). The number of milking stalls 20 is at least partially determined by the number of cows to be processed, the anticipated number of operators as well as the specific milking system.

In one configuration, the operator pit 50 is disposed at a lower elevation than a floor 22 of the milking stall 20. Typically, the operator pit 50 is recessed 30 to 48 inches below the milking stall floor 22. The recessed configuration helps reduces operator fatigue. However, it is understood the operator pit 50 can be level with the floor 22 of the milking stall 20.

Referring to FIGS. 8–11, the operator pit 50 can further include a mobile platform 52 translatable across a closed end of the plurality of milking stalls 20 to allow access of the udder from the rear of the animal retained in the respective milking stall via the parallel pattern of milking stalls or from the side via herringbone pattern of milking stalls. The mobile platform 52 can also swivel to allow limited or unrestricted rotation, as well as swinging about a vertical axis VA. This swivel motion allows the operator to prepare the teats and attach the milking units without incurring significant stress or fatigue. In one configuration, the mobile platform 52 travels along a rail or set of rails adjacent the closed end of the milking stalls. Alternatively, the mobile platform 52 includes wheels for engaging a recessed channel or run, wherein the channel directs the linear direction of travel. Typically, the mobile platform 52 includes wheels for engaging the floor of the operator pit 50.

In a further configuration as seen in FIGS. 12–16, wherein the operator 40 includes a milking robot 42, the milking robot can translate along a rail or set of rails for alignment with a respective milking stall 20. The milking robot 42 includes an actuating arm 44 moveable through at least one and typically three degrees of freedom for operably locating a milking claw relative to the teats. The actuating arm 44 can be moved by any of a variety of mechanisms known in the art, including, but not limited to, hydraulics, pneumatics, servos, gearing, linkages and motors. In the rear milking configuration, the milking robot 42 operably locates and withdraws the milking claw along a path between the rear legs of the animal.

The milling robot 42 includes drive motors or actuators for vertical, horizontal and transverse motion. That is, the milking robot can include separate motive generators for each of the three directions. Rack and pinion constructions have been found to perform reliably. Alternatively, multi-axis actuators can be employed. In addition, the milking robot 42 can include sensors 43 for locating the teats relative to the teat cups. The milking robot 42 can include separately operable mechanical hands and fingers for grasping the teat cup.

Each milking stall 20 has a generally closed end 24 adjacent the operator pit 50 and an open end 26 spaced from the operator pit. It is anticipated the longitudinal dimension of the animal is greater than the transverse or lateral dimension. Thus, the milking stall 20 has a longer longitudinal dimension for accommodating the longitudinal dimension of the animal and a shorter width for accommodating the lateral dimension of the animal.

The milking stall 20 is sized to confine the animal to a generally predetermined and fixed location in the stall. That is, the animal 12 is not permitted to lay down, and has restricted lateral tolerance.

The milking stall 20 can be oriented perpendicular to the adjacent portion of the operator pit 50, or inclined (angled) relative to the operator pit, such as a herringbone pattern.

Figure 3:
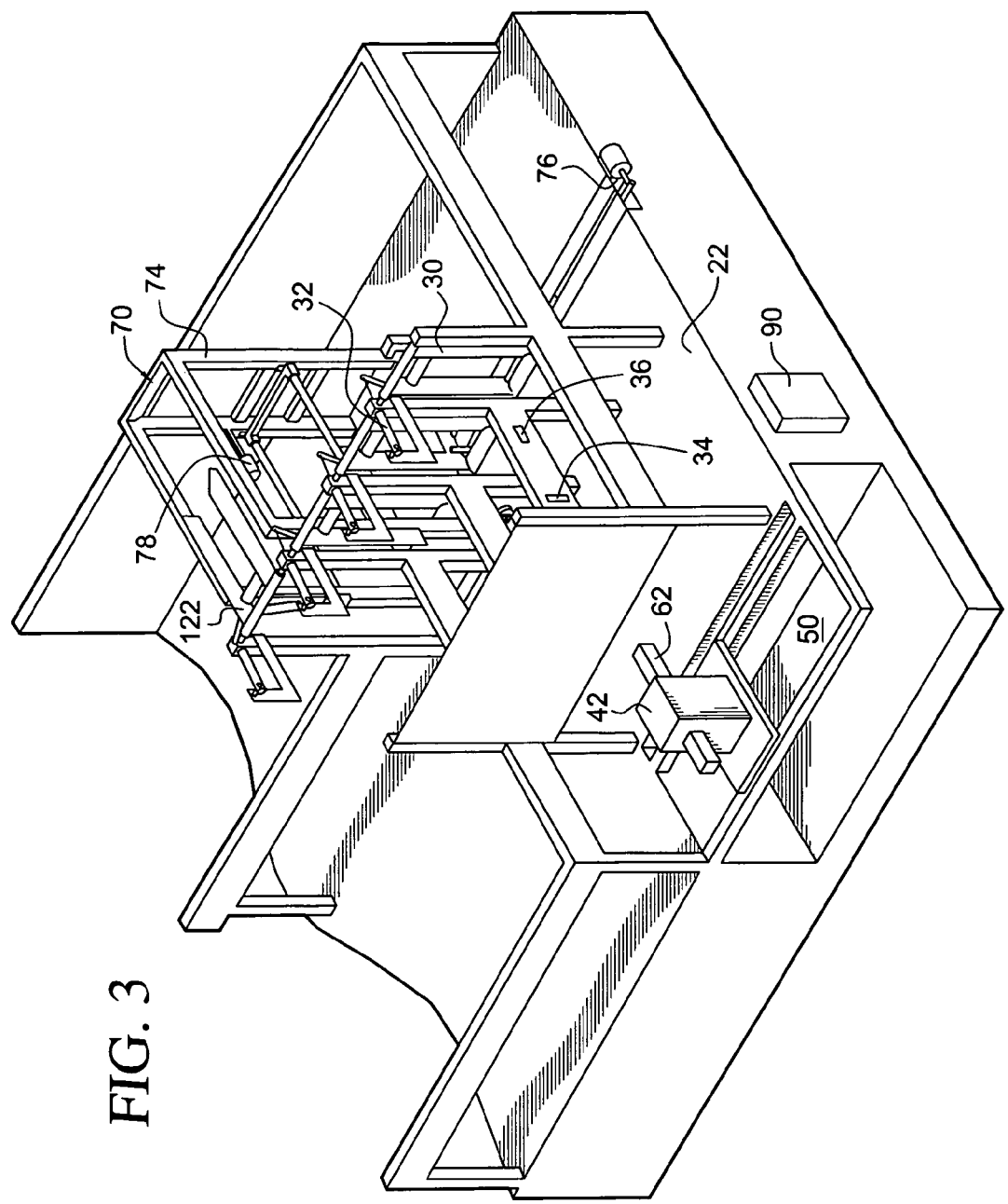
FIG. 3 is a perspective view of the transport cart aligned with a holding area.
Figure 4:
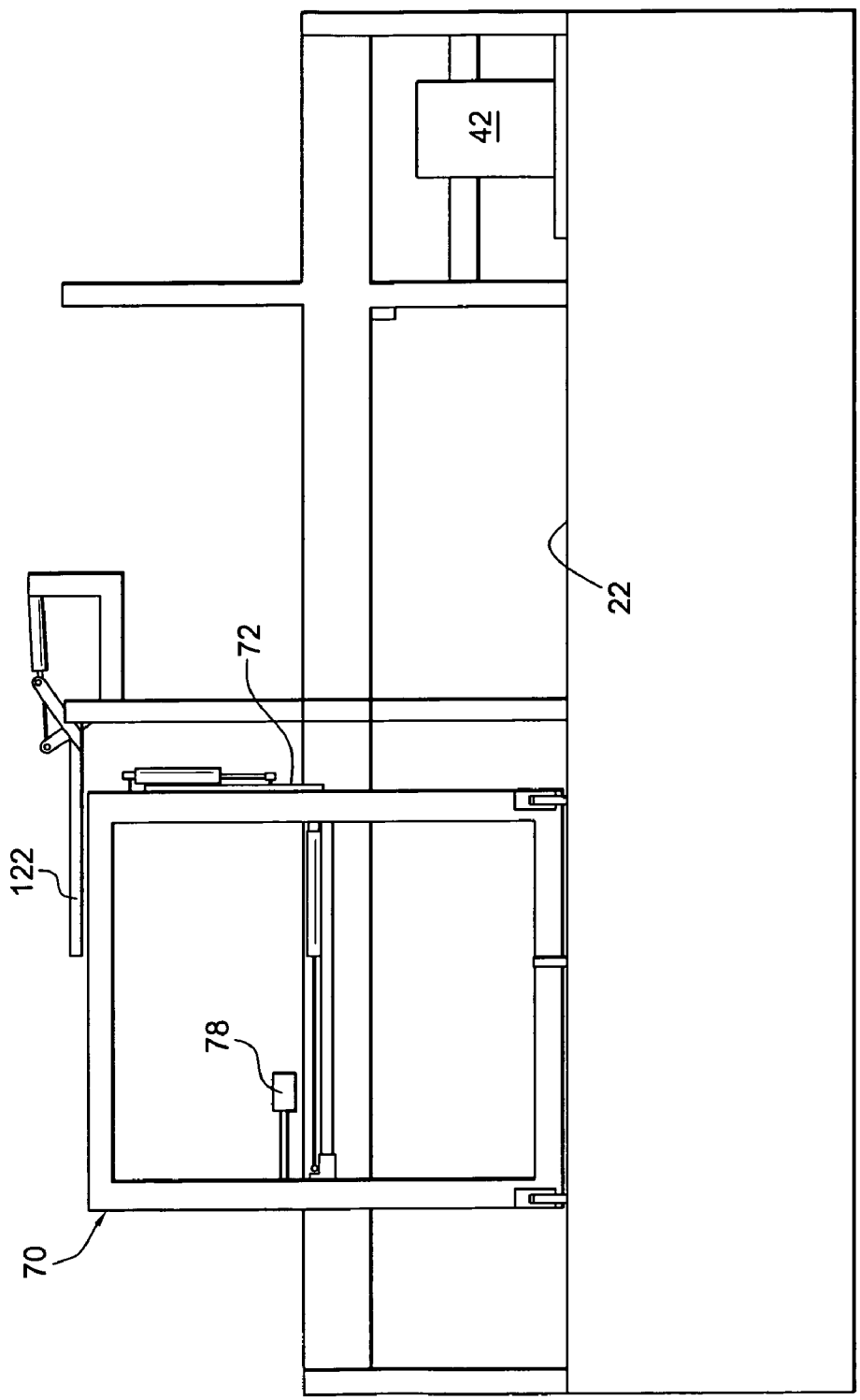
FIG. 4 is a side elevational view of the transport cart aligned with the holding area of FIG. 3.
Figure 5:
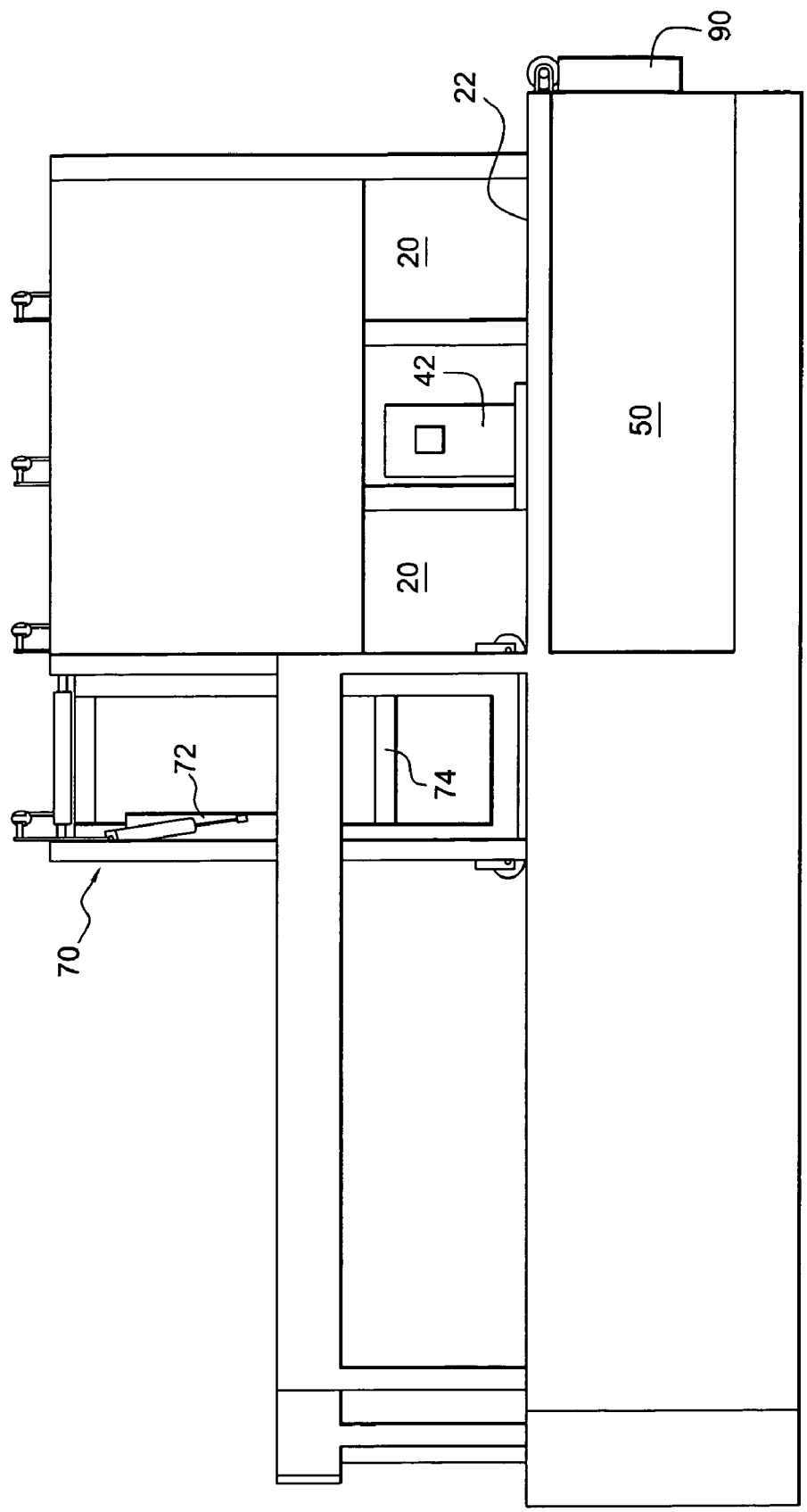
FIG. 5 is a front elevational view of the transport cart operably aligned with the holding area of FIG. 3.
Figure 6:
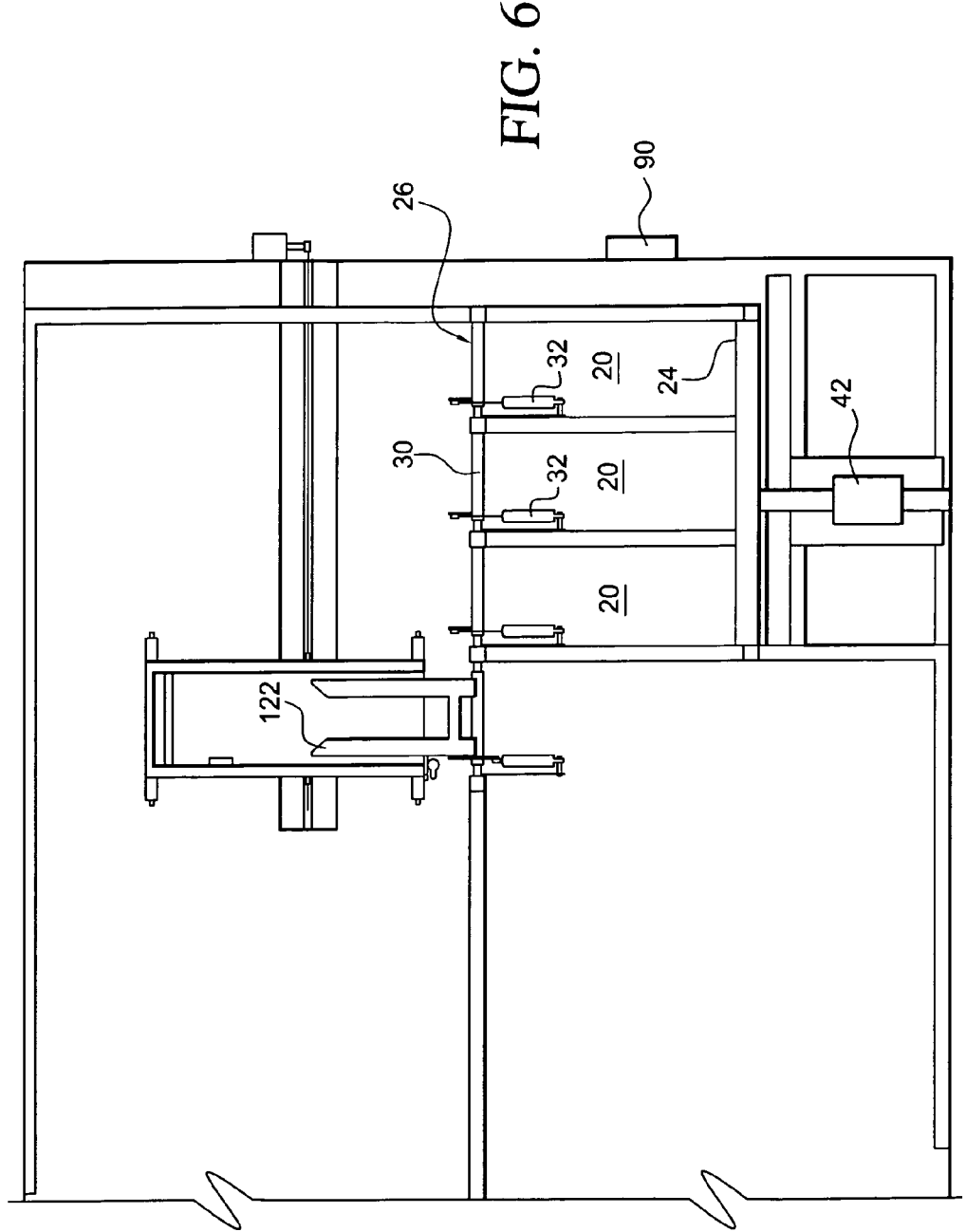
FIG. 6 is a top plan view of the transport cart operably aligned with the holding area of FIG. 3.
Figure 7:
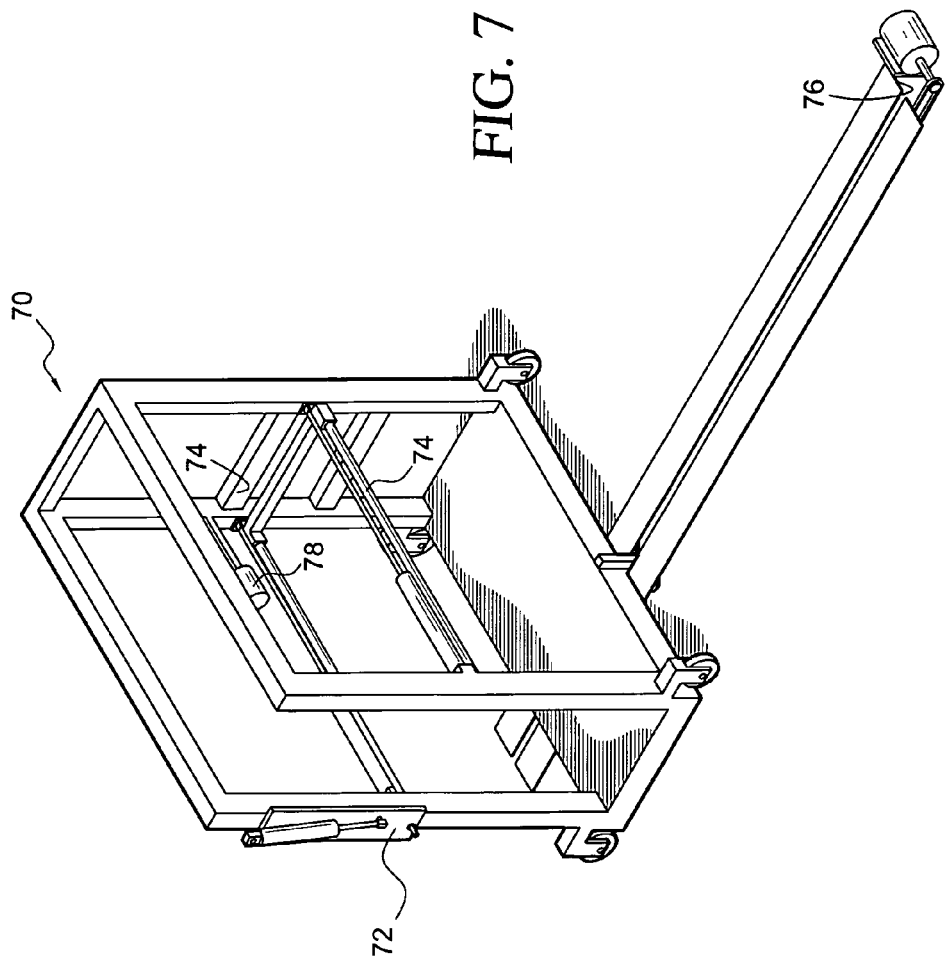
FIG. 7 is an isolated perspective view of the transport cart.
Figure 8:
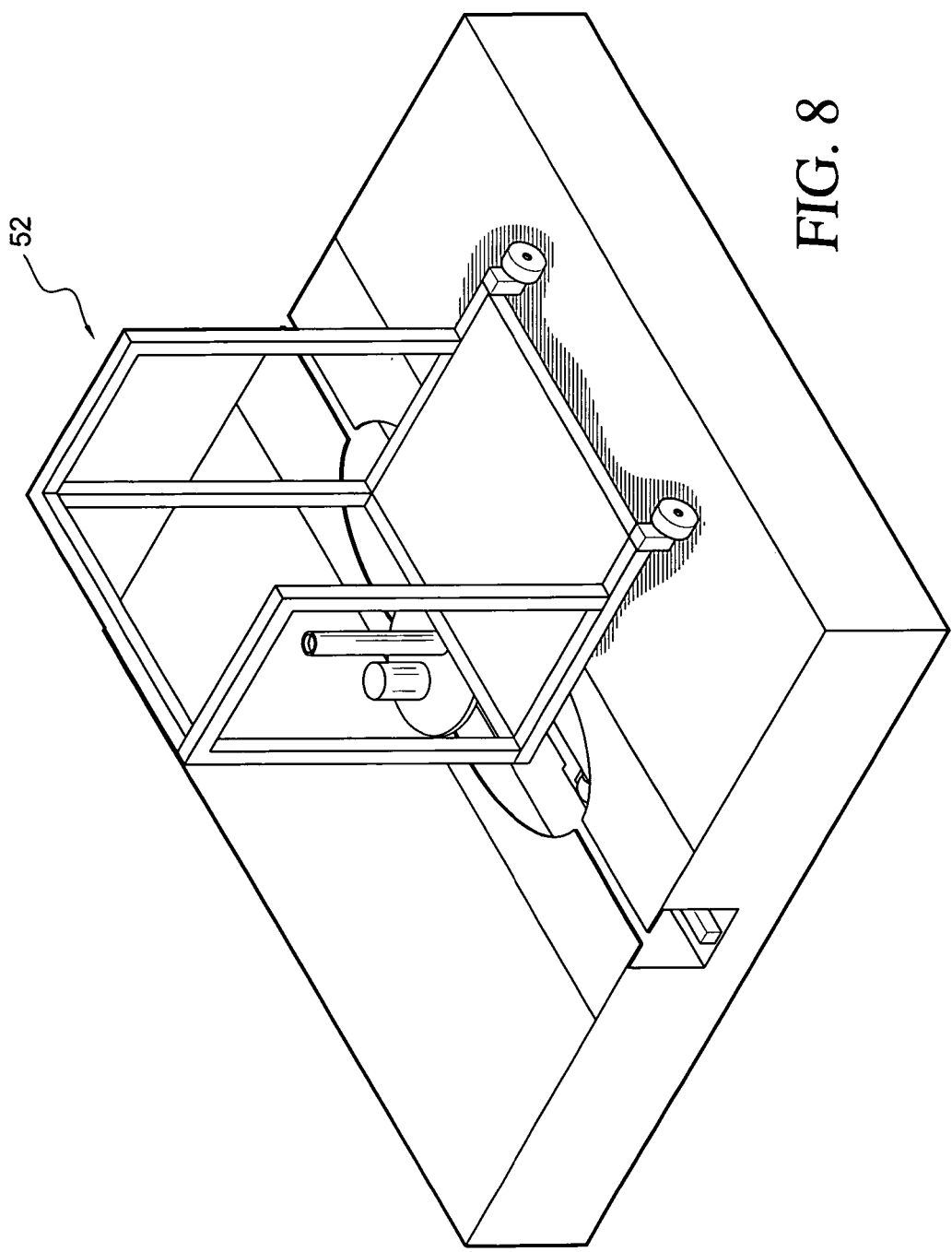
FIG. 8 is an isolated perspective view of a mobile platform.
Figure 9:
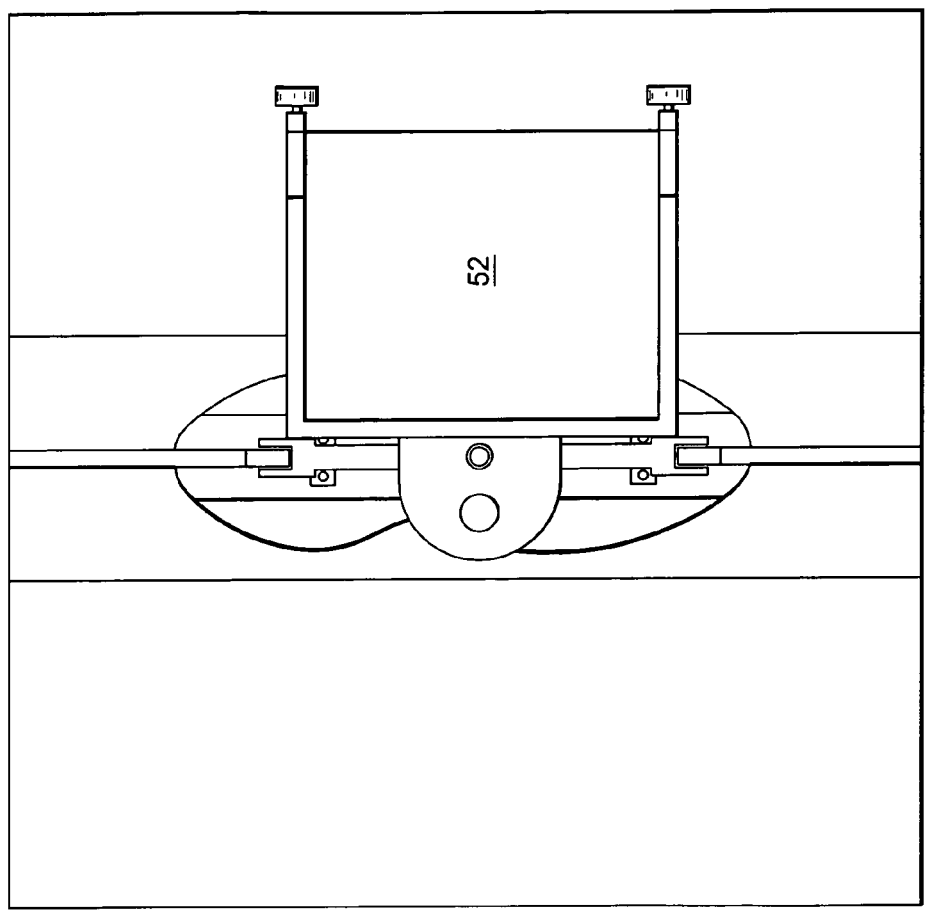
FIG. 9 is a top plan view of the mobile platform.
Figure 10:
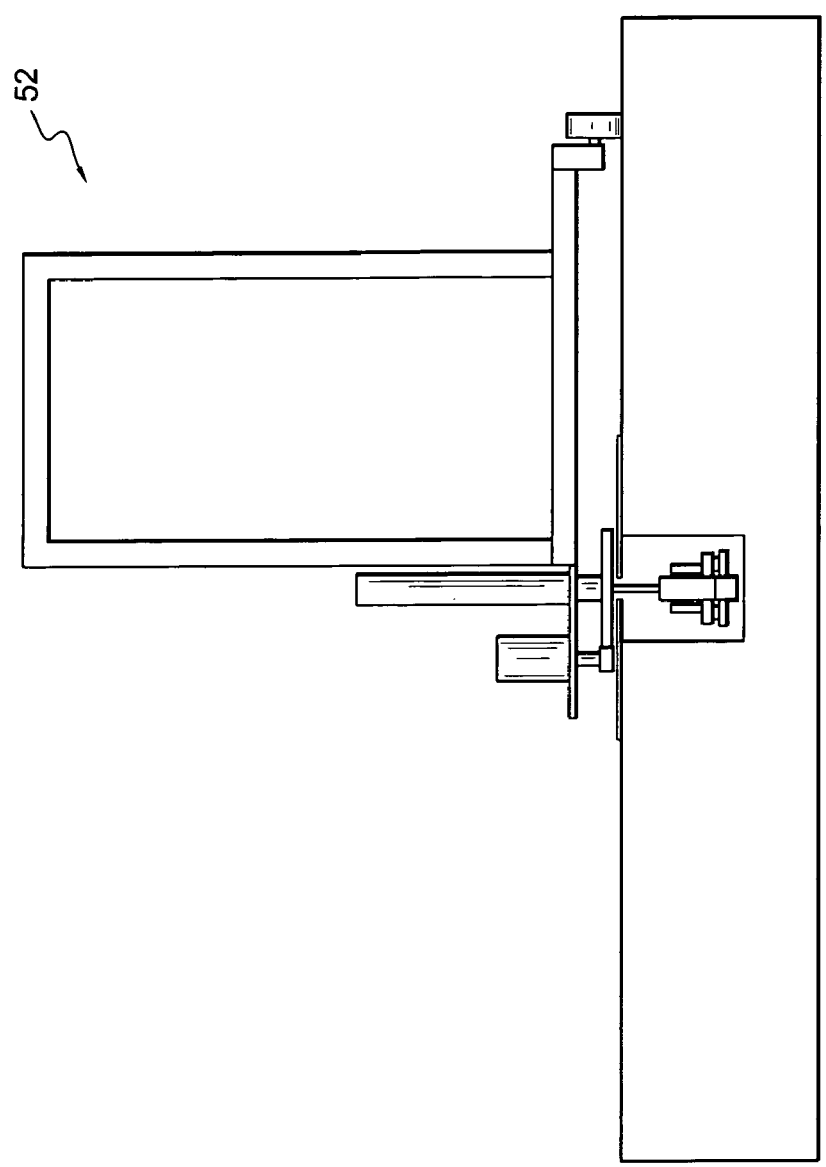
FIG. 10 is a front elevational view of the mobile platform.
Figure 11:
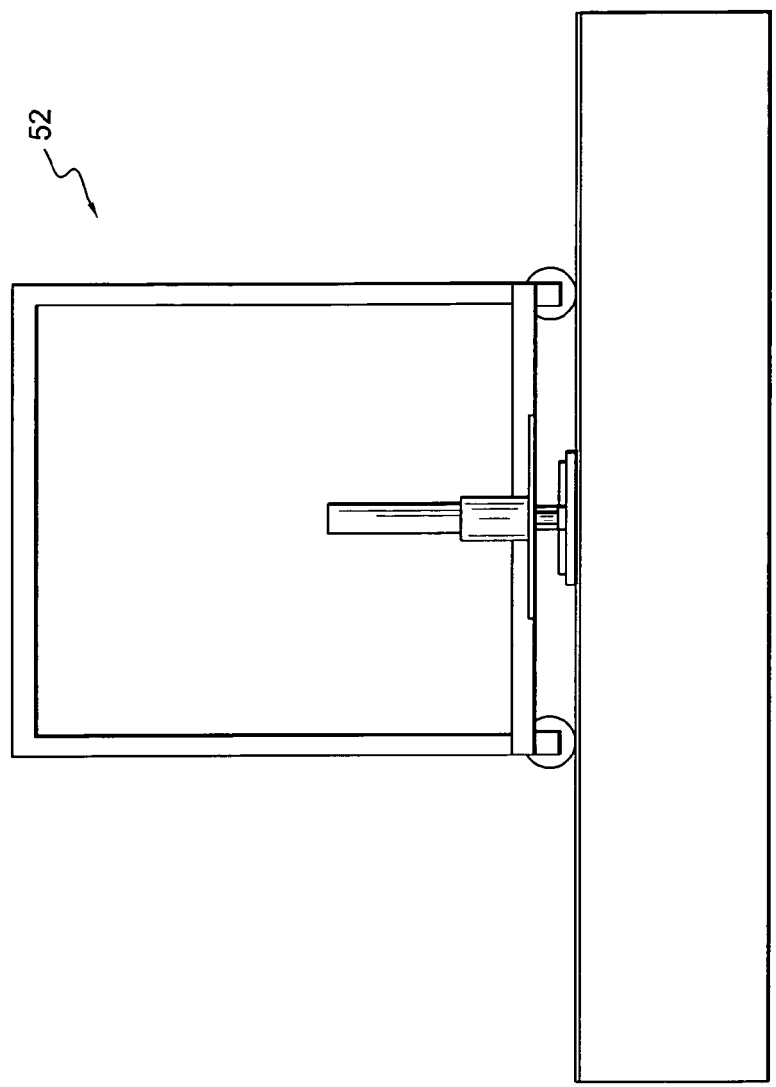
FIG. 11 is a side elevational view of the mobile platform.
Figure 12:
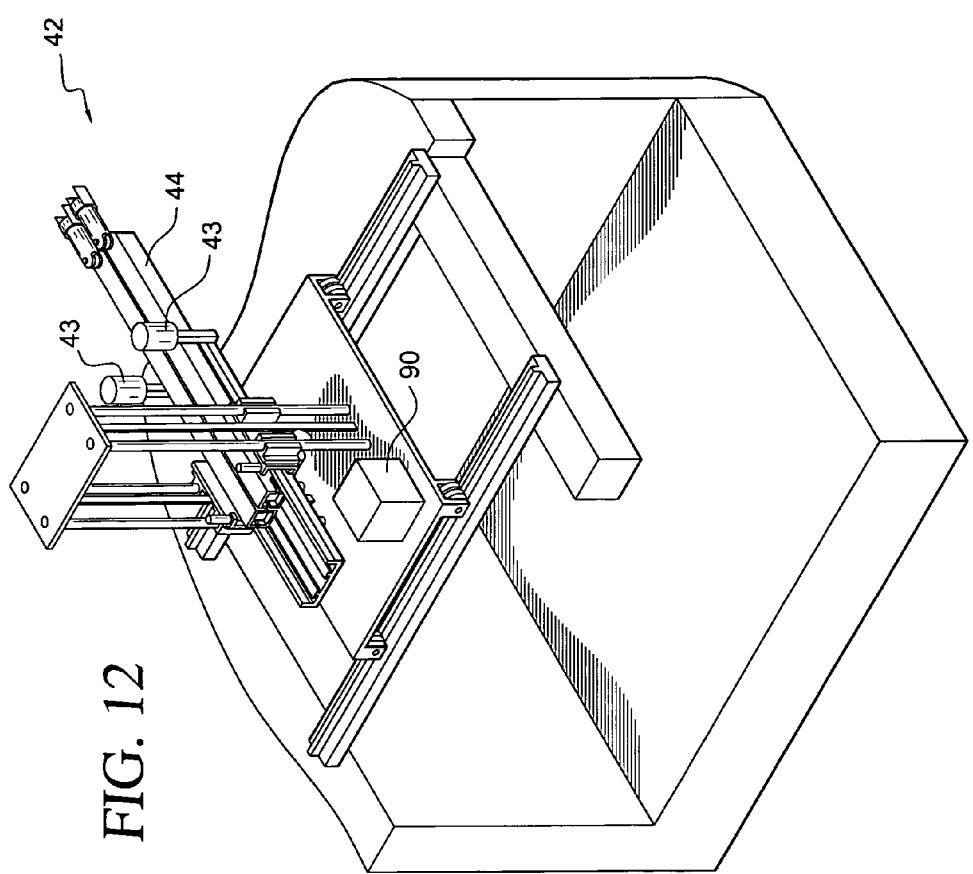
FIG. 12 is a perspective view of a milking robot assembly for locating teat cups with respect to an animal.
Figure 13:
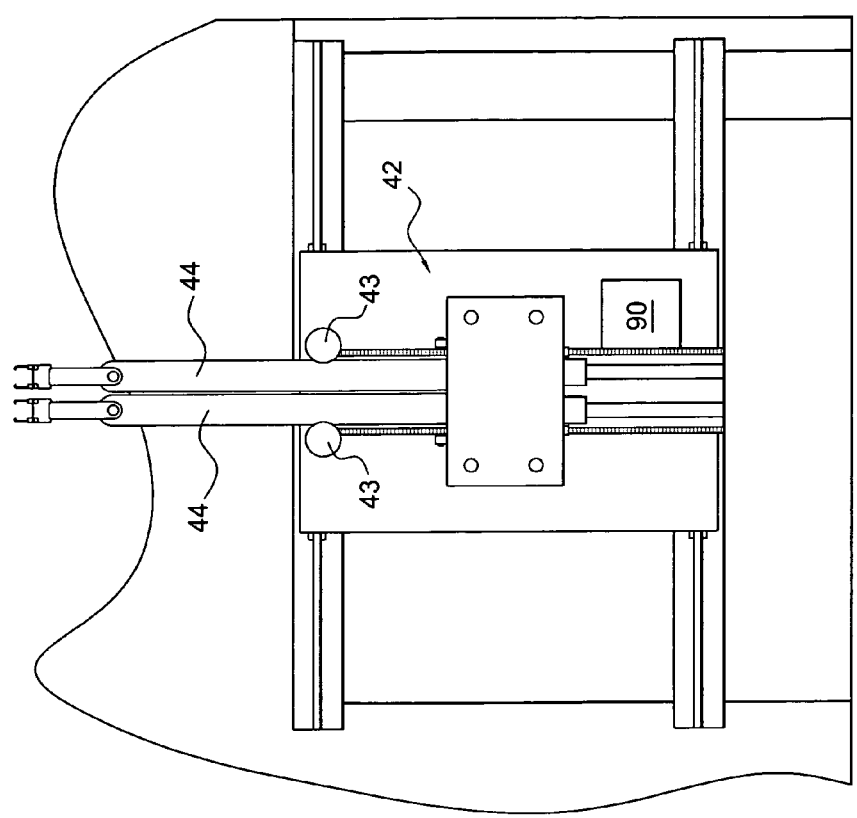
FIG. 13 is a top plan view of the milking robot.
Figure 14:
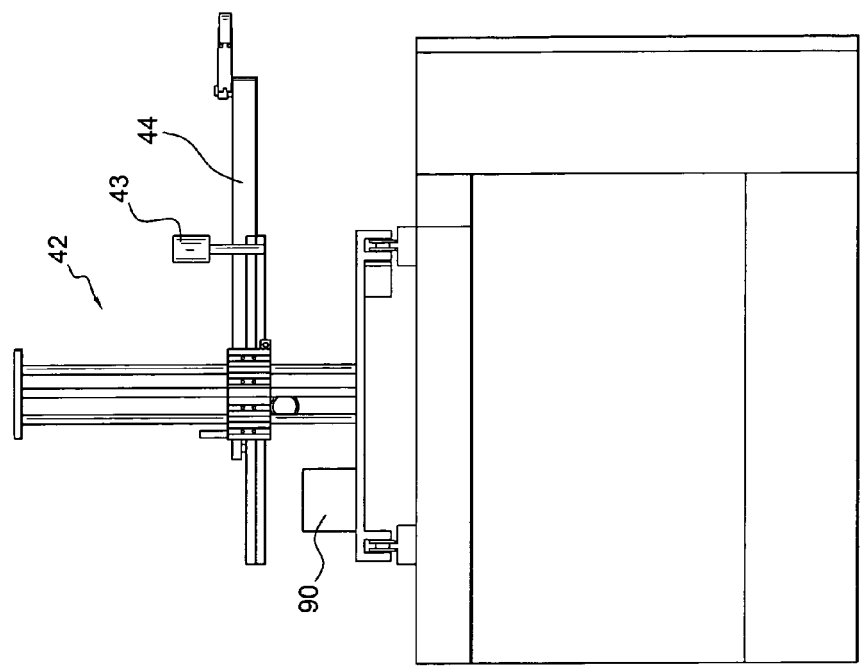
FIG. 14 is a side elevational view of the milking robot.
Figure 15:
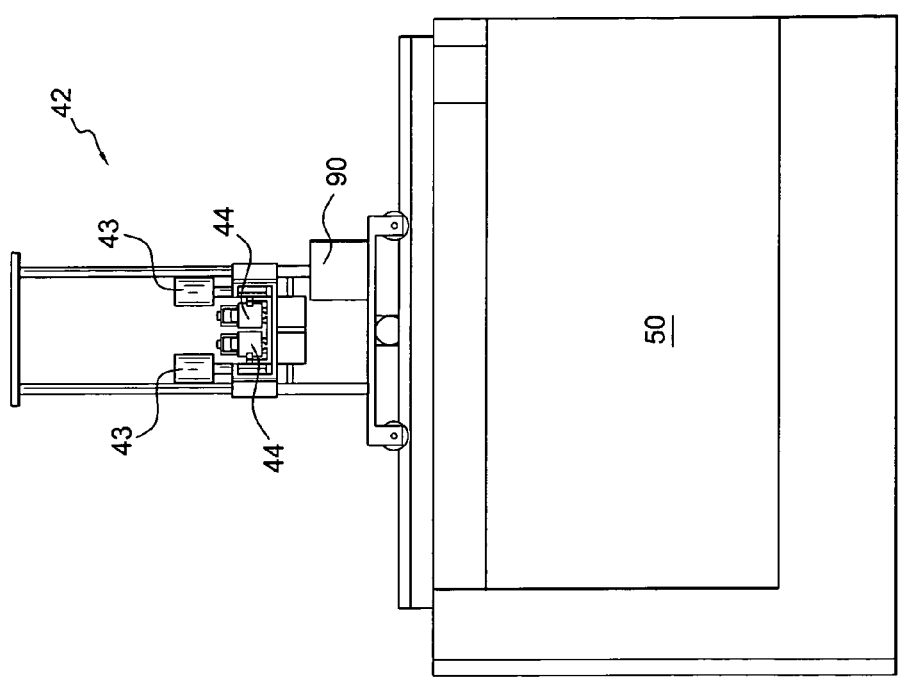
FIG. 15 is front elevational view of the milking robot.
Figure 16:
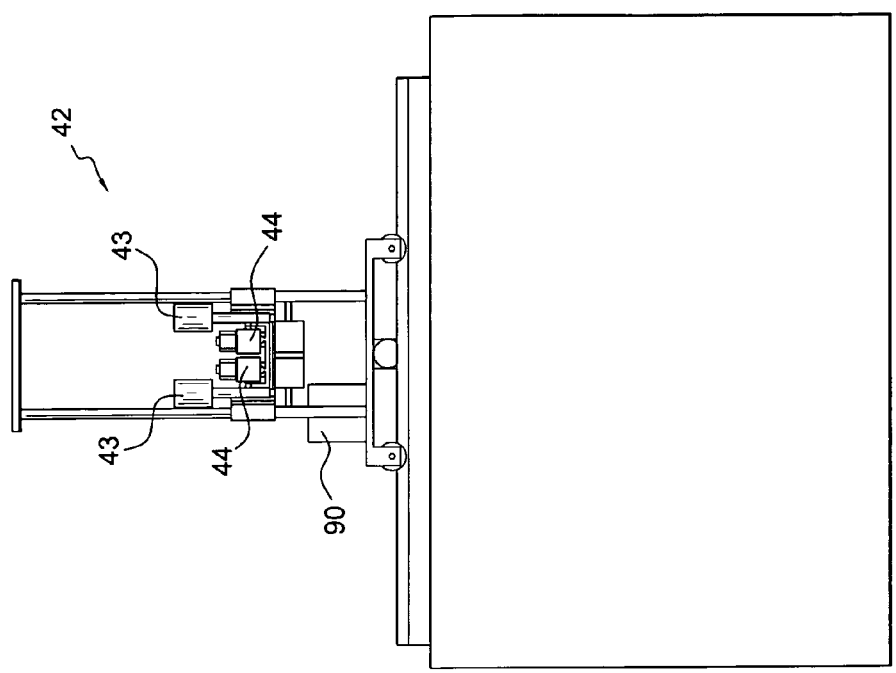
FIG. 16 is a rear elevational view of the milking robot.

As shown in FIGS. 2–4, the open end 26 preferably includes an ingress/egress gate 30 for selectively closing the milking stall 20.

The ingress/egress gate 30 can be any of a variety of configurations including horizontally or vertically swinging gates as well as vertically or horizontally translating gates. That is, the ingress/egress gate 30 can be a swing gate, a slide gate or a lift gate.

The ingress/egress gate 30 is movable between an open and a closed position. Movement of the ingress/egress gate 30 between the open and the closed position can be provided by human or automated actuators 32. The actuators 32 include, but are not limited to pneumatic, gear, chain, and hydraulic or biased actuators. The actuators 32 can be manually or automatically triggered. That is, sensors 34 can be operably located relative to the milking stall 20 to be provide a signal for opening or closing the ingress/egress gate 30. Available sensors 34 include position or pressure or weighing or location sensors, as well as process sensors connected to the milking process and particularly termination of the milking process. The actuators 32 and sensors 34 can be operably connected to the controller 90 for regulating the opening and closing of the ingress/egress gate 30.

In further configurations, it is contemplated the milking stall 20 can include a milk meter 36. The milk meter 36 can be connected to the controller 90 through a wired or wireless connection. The milk meter 36 is known in the industry and typically includes a microprocessor and sensors for determining milk yield, milk temperature, milk conductivity, cow connection status, which data is transmitted to the controller.

In one configuration, the animal is milked from a rearward milking unit. That is, the milking unit comes from behind the animal and through the rear legs of the animal to access the teats.

In a further configuration, the milking unit comes up through the floor of the stall directly under the udder of the animal. An actuating mechanism for the milking unit can pass between the rear legs, from the side of the animal or from beneath the animal.

In a further configuration, the milking parlor 10 includes a queuing or holding area 120 and a released area 180, wherein animals are selectively passed from the holding area, to the milking stall 20 and subsequently from the milking stall to the released area 180. The holding area 120 includes an entrance gate 122 through which the animals must pass to access the milking stall 20.

The milking stalls 20 are spaced from the holding area 120 and specifically the entrance gate 122, such that the animals must move from the holding area 120 to an empty or vacant milking stall.

In one configuration, a transport cart 70 is movable from the entrance gate 122 of the holding area 120 to a position adjacent the ingress/egress gate 30 of each milking stall 20. The transport cart 70 presents the animal to the ingress/egress gate 30 such that the rear or tail of the animal is nearer the ingress/egress gate. Thus, the animal must back into the milking stall 20.

Preferably, the transport cart 70 includes a rail or pen structure 74 for retaining the animal to be milked on the cart. The transport cart 70 moves along any of a variety of tracks 76 such as, but not limited to rails, channels, slots or guideways. Although the tracks are shown as linear, it is contemplated the tracks can define a curvilinear path, or a path having intersecting vectors. However, for simplicity and reduced manufacturing costs, the track 76 is shown as linear.

Depending upon the orientation and position of the transport cart 70, the cart path and the milking stalls 20, the transport cart 70 can include a closing gate 72 for precluding rearward passage of the animal from the transport cart. Alternatively, the structure of the plurality of milking stalls 20 and the transport cart 70 can be selected such that during translation from the queuing area 120 to the milking stall 20, exiting from the transport cart is precluded. For example, the closed ingress/egress gate 30 of an occupied milking stall 20 can function to preclude an animal from exiting the transport cart 70. A further configuration includes the transport cart 70 having a plurality of cart stalls. That is, the transport cart 70 is sized to carry at least two animals from the holding area 120 to the milking stalls 20. In this configuration, the transport cart 70 includes a divider for at least partially defining the cart stalls. Further, each cart stall can include a Radio Frequency Identification Device or RFID reader 78. In this configuration it is also understood, the holding area 120 can include a number of gates corresponding to the number of cart stalls on the transport cart 70.

It is understood a plurality of animals can be simultaneously unloaded from the transport cart 70 into the milking stalls 20. That is, for such vacant milking stalls 20 that align with occupied cart stalls, the animals can be simultaneously loaded into the milking stalls.

As each milking stall 20 is operated independently, each milking stall can include a push back gate for urging the animal to a proper alignment with respect to the gutter. In contrast, prior systems employ a common push rail that extends across several milking stalls. Thus, in the prior systems the amount of push back is limited to the size of the largest of the several animals.

The transport cart 70 can be operably disposed by operator power, chain drives, hydraulic drives, pneumatic drives or electric motors. Initiation of cart translation can be by manual or automatic control. For manual control, the operator verifies the animal position in the transport cart 70 and directs the cart to align with the empty milking stall 20. In an automatic system, a controller 90 may receive signals from milking stall sensors indicating the empty or occupied status of a milking stall 20, as well as the position and occupancy of the transport cart 70. The controller 90 can thus locate the transport cart 70 at the holding area 120 to receive an animal, translate the transport cart to align with an empty milking stall 20, and actuate the incentive to back the animal into the milking stall. It is also contemplated the controller can operate the ingress/egress gate 30 of the milking stall 20.

In some configurations, the transport cart 70 can include the radio frequency identification device (RFID) reader 78. Thus, for those operations in which the animals are associated with an RFID, the RFID reader 78 can provide signals to the controller 90 corresponding the particular animal. In prior systems, wherein a sequence or procession of animals having an RFID tag are scanned by a single RFID reader, an error in a reading or a misread tag creates errors in subsequent readings. That is, a single error can cascade into a misalignment of all subsequent milking data. In contrast, the incorporation of the RFID reader into the transport cart 70 eliminates the error cascade issue. In addition, the RFID reader 78 on the transport cart 70 has an increased time period in which to make the necessary reading. Further, even if an RFID reading is not completed while the animal is on the transport cart, the lack of a reading does not influence the correlation of milking data for any subsequent animal.

Thus, the animal identified by the RFID reader can be matched to the monitored animal specific milking data, which data is acquired in the milking stall 20. As the controller is operably connected to the RFID reader and the milking stall, the controller can perform this matching in real time during the milking process, or a later time.

The animal can be induced to back up or move rearwardly from the transport cart 70 and through the ingress/egress gate 30 by disposing an object or air current to the face of the animal, thereby initiating rearward motion. Therefore, the transport cart 70 can include an air jet or moveable blinder to induce the rearward motion of the animal from the cart, into the milking stall 20.

The released area 180 is sized to permit the animal to fully pass from the milking stall 20, without having to share a path with unmilked or other released, milked animals. Alternatively stated, the animal can exit the milking stall 20 and pass to the released area 180 in an unrestricted manner.

Thus, a unique exit path is provided for each milking stall 20 extending from the given milking stall to the released area 180. As shown, the unique exit path does not require corresponding gating, rails or fencing. In the released area 180, a plurality of animals can assume a herd configuration, wherein the animals can be oriented in any direction. That is, the released area 180 has a longitudinal dimension greater than a plurality of animal lengths and a transverse dimension greater than a plurality of animal lengths.

Further, as seen in FIG. 1, the milking parlor 10 is constructed such that the travel path of the animal extends from the holding area 120 and entrance gate 122, through the released area 180 and into the milking stall 20. Then, the travel path extends from the milking stall 20 into the released area 180.

Operation

In a first configuration, the ingress/egress gate 30 is disposed in the open position and the animal to be milked is backed into the milking stall 20 so as to provide rearward loading the animal. Upon being located within the milking stall 20, the ingress/egress gate 30 is moved to the closed position, thereby retaining the animal to be milked within the milking stall 20.

The milking process is then performed, with the teats being accessed from between the rear legs of the animal. For example, the robotic actuating arm 44 can locate the milking unit relative to the teats for milking.

After termination of the milking process, the ingress/egress gate 30 is moved to the open position and the animal is forwardly unloaded from the milking stall 20 along the corresponding unique exit path.

In operation of the configuration employing the transport cart 70, the animal to be milked is initially retained in the holding area 120. The animal exits the holding area 120 through the entrance gate 122 to enter the transport cart 70. If the optional closing gate 72 on the transport cart 70 is employed, the closing gate is closed, thereby retaining the animal on the transport cart.

The transport cart 70 is then moved relative to the ingress/egress gate 30 of the milking stalls 20 to operably align the transport cart with a vacant milking stall with the ingress/egress gate 30 already at the open position. The transport cart gate 72 is then opened and the cow is urged to back into the milking stall 20. Alternatively, if the transport cart 70 does not include the closing gate 72, the cow is urged to rearwardly load the milking stall 20 upon operably aligning with the stall.

As before, after the animal is rearwardly loaded into the milking stall 20, the ingress/egress gate 30 of the milking stall 20 is moved to the closed position to operably retain the cow. The transport cart 70 is then translated to the holding area 120 for transporting a subsequent animal to be milked to an open milking stall 20.

Upon the milking process being complete within a given milking stall 20, the ingress/egress gate 30 is moved to the open position and the cow is permitted to entirely pass from the milking stall into the released area 180.

The present invention allows non-batch processing of the animals to be milked. That is, the milking cycle for each animal will dictate the duration of time spent in the respective milking stall. In contrast, in batch processing systems, the duration of time for the batch of animals being processed is dictated by the slowest milking time of the batch. In contrast, the present invention allows individual duration times to be determined by the milking time of the respective animal.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

This invention claimed is:

1. A method of presenting an animal to be milked, the method comprising:
   (a) loading a first animal onto a transport cart;
   (b) translating the transport cart to align with an unoccupied milking stall; and
   (c) rearwardly loading the first animal into the unoccupied milking stall from the transport cart.

2. The method of claim 1, further comprising translating the transport cart along a direction transverse to a longitudinal dimension of the milking stall.

3. The method of claim 1, further comprising forwardly unloading the first animal from the milking stall.

4. The method of claim 1, further comprising forwardly unloading the first animal from the milking stall into a released area.

5. The method of claim 1, further comprising forwardly unloading the first animal from the milking stall into a released area along a unique path.

6. The method of claim 1, further comprising loading a second animal onto the transport cart prior to unloading the first animal.

7. The method of claim 1, further comprising moving a moveable platform from a first position spaced from the milking stall to a second position adjacent a rear end of the milking stall.

8. The method of claim 1, further comprising aligning a milking robot with the milking stall.

9. The method of claim 1, further comprising acquiring animal specific data from the first animal on the transport cart.

10. The method of claim 1, further comprising reading a radio frequency identification tag on the first cow when the first cow is in the transport cart.

11. A method of presenting an animal to be milked in a milking parlor, the method comprising:
    (a) moving a first animal to be milked onto a first animal transport cart;
    (b) translating the first animal transport cart along a predetermined path relative to a plurality of milking stalls to operably locate the transport cart with respect to an unoccupied milking stall; and
    (c) moving the animal from the transport cart and into the unoccupied milking stall.

12. The method of claim 11, further comprising forming a released area adjacent the plurality of milking stalls.

13. The method of claim 11, further comprising operably locating a robotic arm with respect to the milking stall to dispose a milking claw into the milking stall.

14. The method of claim 11, further comprising translating a second animal transport cart relative to the plurality of milking stalls.

15. The method of claim 11, further comprising loading a plurality of animals onto the first animal transport cart.

16. The method of claim 11, further comprising moving an ingress/egress gate from an open position to a closed position upon rearwardly loading the animal into the milking stall.

17. The method of claim 11, further comprising acquiring data specific to a given animal during translation of the first animal transport cart.

18. The method of claim 11, further comprising operably connecting a radio frequency identification reader to the first animal cart.

19. The method of claim 11, further comprising urging the animal rearwardly into the milking stall by a distance independent of an adjacent milking stall.

* * * * *